Patented June 13, 1950

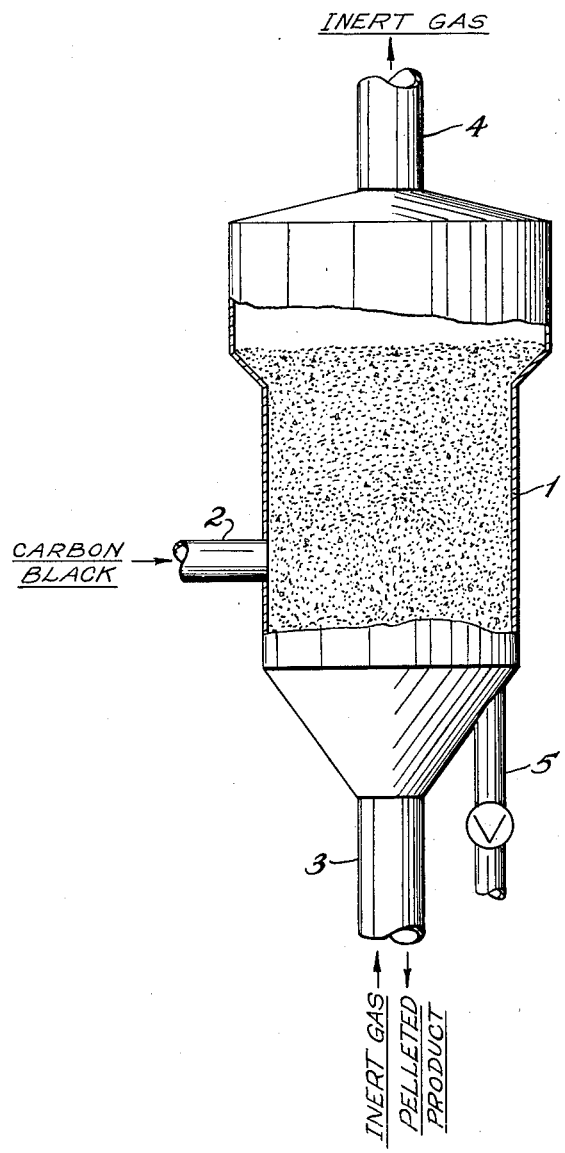

2,511,088

UNITED STATES PATENT OFFICE 2,511,088

PROCESS FOR PELLETING CARBON BLACK

Thomas H. Whaley, Jr., Mount Vernon, N. Y., assignor to The Texas Company, New York, N. Y., a corporation of Delaware Application January 16, 1948, Serial No. 2,706

6 Claims. (Cl. 23—314)

The present invention relates to an improved method for treating finely divided flocculent powders. In one of its more specific aspects, it relates to a process for agglomeration of powdered materials. The invention is particularly adapted to the pelleting of carbon black to form a substantially dustless product.

Carbon black is an amorphous form of carbon. It is usually produced by incomplete combustion of a gaseous hydrocarbon, generally natural gas. It may also be produced by pyrolysis of various hydrocarbons, particularly liquid hydrocarbons.

A number of processes are known for the production of carbon black. Those most widely used are the "channel" process and the "furnace" processes. In the channel process a hydrocarbon gas is burned under conditions of incomplete combustion in small luminous flames. The sooty flames impinge on cool metal surfaces which collect the finely divided carbon. The carbon is scraped from the metal surfaces or "channels," collected, and packaged for shipment.

In the furnace processes, a hydrocarbon oil or gas is heated to an elevated temperature such that it is decomposed with the liberation of finely divided free carbon. The hydrocarbon is subjected to pyrolysis in the gaseous or vaporous state, generally with direct heat transfer to the gases from a hot refractory surface. Partial oxidation is sometimes employed to take advantage of the heating value of the gaseous decomposition products. The carbon black is recovered from the gas stream and packaged for shipment. Recovery of the carbon black from the gas stream is suitably effected by electrostatic precipitation and separation in a centrifugal dust separator of the cyclone type.

By far the greater percentage of carbon black produced is used by the rubber industry as a filler, pigment, and reinforcing agent in manufactured rubber goods. Dry carbon black is mixed with the rubber in compounding operations prior to vulcanization. The handling and mixing operations tend to disperse powdered carbon black in the air, creating a hazard and annoyance to workmen. For convenience in handling and minimization of the dust problem, carbon black for the rubber trade is pelleted. The pellets range from about one-thirty second to about one-fourth inch in diameter and are hard, compact and substantially dustless. Pelleting saves shipping space and reduces the danger of spontaneous combustion. The process of this invention may be used for pelleting the carbon black produced by channel or furnace processes.

Flocculent carbon black as initially produced may be densified by mechanical agitation without appreciable agglomeration. The densifying apparently is accomplished by elimination of gases entrapped mechanically by the carbon particles. As an example, flocculent carbon black having an apparent bulk density of about 3 pounds per cubic foot may be densified by mechanical stirring to an apparent bulk density of about 12 pounds per cubic foot.

A number of methods have been devised for pelleting carbon black. These may be classified generally into wet and dry processes. In the wet processes, water or other liquid is used for wetting the carbon particles as an aid in pelleting. Binding agents may be used, but generally a liquid is used which may be removed substantially completely by evaporation in a subsequent drying operation. In some wet pelleting processes, the carbon black is wetted with sufficient liquid to form a paste or a slurry; in others, only a portion of the carbon is wetted as by a fine spray of liquid to form nuclei around which the pellet is built up to the desired size. A serious disadvantage of the wet pelleting processes is the necessity of drying the pellets before packaging or shipping.

A number of dry pelleting processes have been developed. In some the carbon black is subjected to vigorous mechanical agitation, as with beaters. In others the carbon black is subjected to a rolling or cascading action, as by rolling in a rotating drum. These pelleting processes have met with varying degrees of success, depending upon the type of carbon black processed. The dry process is most successful with channel blacks and the harder thermal or furnace blacks. The softer furnace blacks, currently in demand for compounding synthetic rubbers, may be pelleted dry but are somewhat more difficultly pelletable than harder blacks. Some of these furnace blacks require a great deal of working, and additionally must be seeded with small carbon particles, e. g., broken pellets, for satisfactory pelleting. The disadvantages of dry pelleting, particularly with those blacks which are not readily agglomerated, are the large power and equipment requirements.

The process of the present invention is particularly suited to the pelleting of carbon black in the dry state. This process may also be used for pelleting a carbon black with the aid of a wetting liquid where sufficient liquid is used to wet only a portion of the black to form nuclei for the pellets.

The aparatus required for carrying out the process is compact and trouble-free and has a high capacity. There is no problem of seeding the fresh carbon black as in conventional pelleting processes. In a preferred mode of carrying out the process of my invention, the pellets of carbon black are also sized by the classifying action of a gas stream, and only the pellets of desired size removed from the apparatus.

An object of the present invention is to provide an improved process for treating flocculent powders.

Another object is to provide a process for agglomeration of finely divided powdered materials.

Still another object is to provide a process for the pelleting of carbon black.

Other objects and numerous advantages of the process of this invention will be apparent from the detailed description contained herein.

As an aid in describing the operation of the present process, reference is made throughout this specification to the pelleting of carbon black. While carbon black is especially suited for pelleting by the method of this invention and the pelleting of carbon black is commercially important, other finely divided powders may be treated by this process. This process is particularly suited to pelleting those powders which, like carbon black, may be agglomerated and formed into stable, compact pellets by mechanical agitation. There is good reason to believe that any flocculent powder may be so handled, if desired, since the agglomeration appears to be related to the surface rather than to any peculiar property of the material. Powders which do not readily form pellets by agglomeration and accretion, e. g., somewhat coarser particles, may be pelleted with the aid of a suitable adhesive although this is less desirable than dry pelleting.

Carbon black is pelleted by the process of my invention by subjecting the powdered carbon to the fluidizing action of a stream of gas. The carbon black to be pelleted is fed into a fluidized mass of carbon black wherein flocculent carbon and agglomerate particles in various stages of formation are violently agitated by the gas stream. The agitation and thorough mixing of the particles of various size in the fluidized bed results in rapid and efficient pellet formation. Pellets of desired size may be separated from the powder and undersized agglomerate masses by any suitable means.

The process of this invention will be better understood by the following detailed description of pelleting carbon black with reference to the accompanying drawing. The figure is a diagrammatic elevational view, partly in cross-section, of apparatus suitable for carrying out the process. Since the apparatus is not, per se, novel, and is subject to many variations in design, it has been rendered in its simplest form for illustration. Various pieces of auxiliary equipment, such as blowers, storage vessels, conveyors, dust separators, and the like which are known in those arts wherein fluidization is practiced for other purposes have been omitted for the sake of simplicity.

With reference to the drawing the raw carbon black is supplied to a cylindrical vessel 1 through a supply pipe 2. The finely powdered carbon black may be forced through pipe 2 as a dense powder or supplied in admixture with a gas. Some of the gas required for fluidization may be supplied through pipe 2. A bed of carbon black is maintained in the vessel at all times. Inert gas for fluidizing the bed of carbon black is admitted to the lower portion of the apparatus through pipe 3 and discharged from the upper portion through pipe 4. The upper portion of vessel 1 is enlarged to reduce entrainment of fines in the gas exhausted through pipe 4. Violent agitation of the carbon particles by fluidization causes pellet formation.

The pelleted product is suitably withdrawn from the pelleting vessel through pipe 3 countercurrent to incoming inert gas. By control of velocity of the fluidizing gas entering pipe 3, pellets of desired size may be withdrawn through the pipe substantially free from smaller particles. Alternatively, part or all of the pelleted product may be removed from the pelleting vessel through line 5. Pellets withdrawn through line 5 are admixed with undersized particles which may be separated from the product by any suitable means and returned to the pelleting vessel. Means may be provided for prevention of carbon buildup on the walls of the vessel; an electric vibrator, for example, is satisfactory for this purpose.

The fluidization of particulate solids with gases is now well known in the arts of catalytic cracking of petroleum, gasification of solid fuels, and synthesis of hydrocarbons from carbon monoxide and hydrogen. The fluidization of solids as recognized in these arts refers to imparting ebullient motion to a mass of discrete solid particles. The particles are not suspended in the gas stream but are in a state of hindered settling. A bed of particles so fluidized is agitated throughout so that it resembles in appearance a boiling liquid.

As pointed out above, fluidization of solids has been utilized in unrelated arts heretofore. Fluidization of catalysts or of particles of coke as practiced in these arts does not cause agglomeration of the particles; in fact, in many instances one of the advantages of fluidization in these arts is that it minimizes agglomeration which might otherwise tend to occur. Agglomeration of the fluidized powders has not been observed in the processes referred to primarily because the particles used in these processes are considerably larger than the flocculent powders to which the present process is applied. Fine particles which may be present are diluted with a large quantity of relatively coarser particles to which they do not adhere on collision. As is well known, carbon black particles, presumably because of their large surface, tend to agglomerate when the particles collide and individual particles or smaller aggregates build by accretion or larger aggregates to form stable, compact pellets which are roughly spherical. Thus the pellets are formed in dry processes by mechanical agitation or by rolling. So far as I am aware, no one has ever applied the fluidized solids technique to the problem of pelleting flocculent powders and particularly carbon black.

Fluidization of the carbon black in accordance with this invention eliminates many of the problems which are met in conventional apparatus. As mentioned hereinabove, there is no problem of seeding the raw black. Seeding, as practiced in the art, involves supplying small agglomerates or seeds, e. g., undersized or broken pellets screened from the product, to the fresh feed to start the agglomeration of the raw black. Elaborate apparatus has been developed for seeding the raw black in prior art processes. The problem is particularly pronounced with those carbon blacks which are more difficult to pellet, e. g., soft furnace blacks. In a fluidized bed, there is a thorough mixing of the particles in the bed so that the incoming fresh carbon black is always brought into contact with agglomerate masses and pellets in their various stages of development. By the selective classifying action of the fluidizing gases on the particles, the larger particles or finished pellets may be segregated in the lower part of the bed and removed substantially free from dust and fines. Obviously, a mixture may be withdrawn from the fluidized mass and the finished pellets separated therefrom in any suitable manner, as by screening.

In starting up the pelleting apparatus, it is advisable to charge pellets into the vessel for fluidization with the raw carbon black. The initial charge of pellets aids in starting the pellet formation and reduces carryover of fine dust. Broken pellets or seeds may also be added to start pelleting. Once pelleting is started, seeding is automatically taken care of by breaking down of unstable pellets and natural agglomerate formation starting from powders.

Preferably, the raw carbon black is predensified prior to feeding it into the pelleting vessel. This may be accomplished by mechanical agitation, as is known in the art. Handling of the raw carbon black in the plant in most instances effects sufficient densification without any special apparatus for this purpose.

Any gas which is unreactive with the powder is suitable for fluidization. Preferably oxygen is substantially excluded from the gas stream since it presents an explosion hazard when used with a combustible dust. Suitable gases include nitrogen, carbon dioxide, and mixtures thereof, for example, flue gas. Other inert gases may be used, for example, methane, natural gas, rare gases, and the like, but these are in general less readily available than flue gas or are objectionable for other reasons. Vapors, e. g., steam or hydrocarbon vapors may be used as or with the fluidizing gas.

The temperature and pressure at which the process is carried out is relatively unimportant. Suitably the process is carried out at substantially atmospheric pressure and at atmospheric or slightly elevated temperature.

The gas velocity in the zone wherein the carbon black is pelleted should be sufficient to effectively fluidize the mass which comprises particles ranging in size from flocculent powder to finished pellets. At the same time, the gas velocity, particularly in the upper portion of the bed or the zone immediately above the bed, is preferably less than that required for suspension or entrainment of the fine particles. Enlargement of the cross-sectional area of the pelleting apparatus above or at about the upper level of the bed is a highly satisfactory method of reducing gas velocity at this point and limiting carryover of fine particles. Various known types of separators, e. g., of the cyclone or electrostatic type, may be used either inside or outside the pelleting vessel for separating fines from the exhaust gases. Where the pellets are withdrawn from the vessel free from fine particles, the velocity of the gas at the point of pellet withdrawal should be sufficient to classify the particles and permit only those of the desired size to escape from the vessel.

The highly turbulent condition of the bed suffices to give ample opportunity for numerous collisions between particles of various sizes. Preferably the bed of carbon black is at least four feet in depth to insure efficient fluidization. The bed depth may be considerably greater, and with some apparatus, may be somewhat less.

The inert gas exhausted from the pelleting vessel may be discarded or recirculated to the vessel. In either event it may be processed for removal of dust. Discharged gas may be passed through the plant recovery system. Recirculated gas may contain large quantities of carbon black without detriment to the pelleting. Preferably, however, the pelleted product leaving the vessel is contacted with substantially dust-free gas to eliminate dust in the product.

If desired, as mentioned hereinbefore, a spray of a suitable wetting liquid may be employed as an aid in pelleting. The liquid may be dispersed in the carbon black in small droplets directly in the apparatus or in the incoming carbon black. The inert gas coming into the vessel may be used as a drying gas to subsequently vaporize the wetting liquid for production of a substantially dry pellet.

An inert granular material capable of fluidization may be present in the pelleting vessel to aid in the pelleting. For example, silica beads may be charged to the pelleting apparatus for admixture with the carbon black as an aid in pelleting and cleaning the surfaces of the vessel. By a proper choice of bead size and density as compared with product pellets and gas velocities, the beads may be retained in the pelleting vessel indefinitely.

A stirrer or agitator may be provided within the pelleting vessel if desired. Suitable stirrers are those which aid uniform fluidization and mixing in the vessel.

Obviously many modifications and variations of the invention as above set forth may be made without departing from the spirit and scope thereof, and therefore only such limitations should be imposed as are indicated in the appended claims.

I claim:

1. A process for pelleting carbon black which comprises feeding powdered carbon black into a bed of carbon black containing agglomerate particles and maintained in a fluidized condition by passage of a gas chemically inert with respect to said carbon black upwardly therethrough at a rate sufficient to impart motion to the particles of carbon black in the bed whereby agglomerate pellets are formed, and recovering the resulting pellets.

2. A process as defined in claim 1 wherein a spray of wetting liquid is supplied to said bed as an aid in agglomeration of said powder.

3. A process as defined in claim 1 wherein said bed contains an inert granular solid material which is fluidized with the carbon black.

4. A process for pelleting carbon black which comprises feeding powdered carbon black into a bed of carbon black containing agglomerate particles and maintained in a fluidized condition by passage of a gas chemically inert with respect to said carbon black upwardly therethrough, supplying said gas to a lower portion of said bed at a rate sufficient to impart motion to the particles of carbon black in the bed whereby agglomerate pellets are formed, discharging inert gas from the top of said bed, and withdrawing pelleted products substantially free from unpelleted powder from said bed.

5. A process as defined in claim 4 wherein the product is withdrawn from the bed at substantially the point of entry of inert gas.

6. A process as defined in claim 4 wherein inert gas discharged from the top of said bed is recirculated to the lower portion of the bed for fluidization.

THOMAS H. WHALEY, JR.

REFERENCES CITED

The following references are of record in the file of this patent:

UNITED STATES PATENTS

| Number | Name | Date |
| --- | --- | --- |
| 2,221,175 | Bechtold | Nov. 12, 1940 |
| 2,293,113 | Carney | Aug. 18, 1942 |
| 2,412,667 | Arveson | Dec. 17, 1946 |
| 2,421,212 | Medlin | May 27, 1947 |